(12) United States Patent
Hendry et al.

(10) Patent No.: US 6,403,014 B1
(45) Date of Patent: *Jun. 11, 2002

(54) METHOD FOR FLUID COMPRESSION OF INJECTION MOLDED PLASTIC MATERIAL

(75) Inventors: James Watson Hendry, Brooksville, FL (US); John Michael Heuchert, Macomb, MI (US)

(73) Assignee: Incoe Corporation, Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/777,357

(22) Filed: Dec. 27, 1996

Related U.S. Application Data

(63) Continuation-in-part of application No. 08/240,910, filed on May 11, 1994, now abandoned, and a continuation-in-part of application No. 08/083,382, filed on Jun. 28, 1993, and a continuation-in-part of application No. 07/961,615, filed on Oct. 15, 1992, now Pat. No. 5,344,596, which is a continuation of application No. 07/855,236, filed on Mar. 23, 1992.

(51) Int. Cl.$^7$ ............................................. B29C 43/56

(52) U.S. Cl. ................. 264/500; 264/571; 264/572; 264/101; 264/102

(58) Field of Search ................. 264/500, 571, 264/572, 101, 102, 328.1, 328.8, 328.12

(56) References Cited

U.S. PATENT DOCUMENTS

| 2,615,229 A | 10/1952 | Blackburn |
| 3,329,198 A | 7/1967 | Manning |
| 3,345,687 A | 10/1967 | Marx |
| 3,351,983 A | * 11/1967 | Grigull ........................ 264/102 |
| 3,906,066 A | 9/1975 | Barrie |
| 4,096,218 A | 6/1978 | Yasuike |
| 4,101,617 A | 7/1978 | Friedrich |
| 4,129,635 A | 12/1978 | Yasuike |
| 4,131,665 A | 12/1978 | Bodson et al. |
| 4,140,672 A | 2/1979 | Kataoka |

(List continued on next page.)

FOREIGN PATENT DOCUMENTS

| AU | 1315088 | 9/1988 | |
| DE | 2022686 | * 12/1971 | ................. 264/571 |
| EP | 127961 | 12/1984 | |
| EP | 283207 | 9/1988 | |
| FR | 2105498 | 4/1972 | |
| GB | 1556170 | 11/1979 | |
| GB | 2122130 | 1/1984 | |
| GB | 2139549 | 11/1984 | |
| JP | 5075247 | 6/1975 | |
| JP | 5894992 | 11/1981 | |
| JP | 58-115253 | 12/1981 | |
| JP | 58-115254 | 12/1981 | |
| SU | 304141 | 7/1971 | |
| WO | 9006220 | 6/1990 | |
| WO | WO 93/01039 | 1/1993 | |

*Primary Examiner*—Suzannne E. McDowell

(57) ABSTRACT

A mold apparatus and method is used to form a solid injection molded plastic part having no internal voids, a Class A finish, a sink-free exterior appearance surface, and unevenly distributed structural detail extending from the opposite surface, the detail including free-standing reinforcement ribs, attachment bosses, and the like. In sequence, a seal groove in the mold cavity is reduced to a pressure below atmospheric (i.e., negative), a charge of hot thermoplastic is introduced into the mold cavity and seal groove whereby to form a gas seal ring, and pressurized gas is injected into the mold cavity. The pressurized gas forces the hot plastic from one mold half against the other mold half, and the gas seal formed by the plastic prevents gas on one side of the thermoplastic from reaching the appearance surface of the part.

9 Claims, 7 Drawing Sheets

U.S. PATENT DOCUMENTS

| | | | |
|---|---|---|---|
| 4,201,742 A | 5/1980 | Hendry | |
| 4,295,811 A | 10/1981 | Sauer | |
| 4,309,380 A | 1/1982 | Sauer | |
| 4,389,358 A | 6/1983 | Hendry | |
| 4,474,717 A | 10/1984 | Hendry | |
| 4,519,763 A | 5/1985 | Matsuda | |
| 4,531,703 A | 7/1985 | Underwood | |
| 4,740,150 A | 4/1988 | Sayer | |
| 4,755,128 A | 7/1988 | Alexander | |
| 4,797,236 A | 1/1989 | Kojima | |
| 4,917,594 A | 4/1990 | Gellert et al. | |
| 4,923,666 A | 5/1990 | Yamazaki | |
| 4,948,547 A | 8/1990 | Hendry | |
| 5,054,689 A | 10/1991 | Hunerberg et al. | |
| 5,069,858 A | 12/1991 | Hendry | |
| 5,092,759 A * | 3/1992 | Lichinger et al. | 425/812 |
| 5,112,212 A | 5/1992 | Akselrud et al. | |
| 5,118,455 A | 6/1992 | Loren | |
| 5,162,122 A | 11/1992 | Loren | |
| 5,200,127 A | 4/1993 | Nelson | |
| 5,238,378 A | 8/1993 | Gellert | |
| 5,252,287 A | 10/1993 | Fries | |
| 5,273,707 A * | 12/1993 | Carroll | 264/572 |
| 5,286,184 A | 2/1994 | Nakayama | |
| 5,295,801 A | 3/1994 | Sugiyama et al. | |
| 5,302,339 A | 4/1994 | Baxi et al. | |
| 5,306,134 A | 4/1994 | Gill | |
| 5,344,596 A * | 9/1994 | Hendry | 264/500 |
| 5,439,365 A * | 8/1995 | Hendry | 264/572 |
| 5,542,611 A | 8/1996 | Hendry | |
| 5,670,112 A | 9/1997 | Csongor et al. | |

* cited by examiner

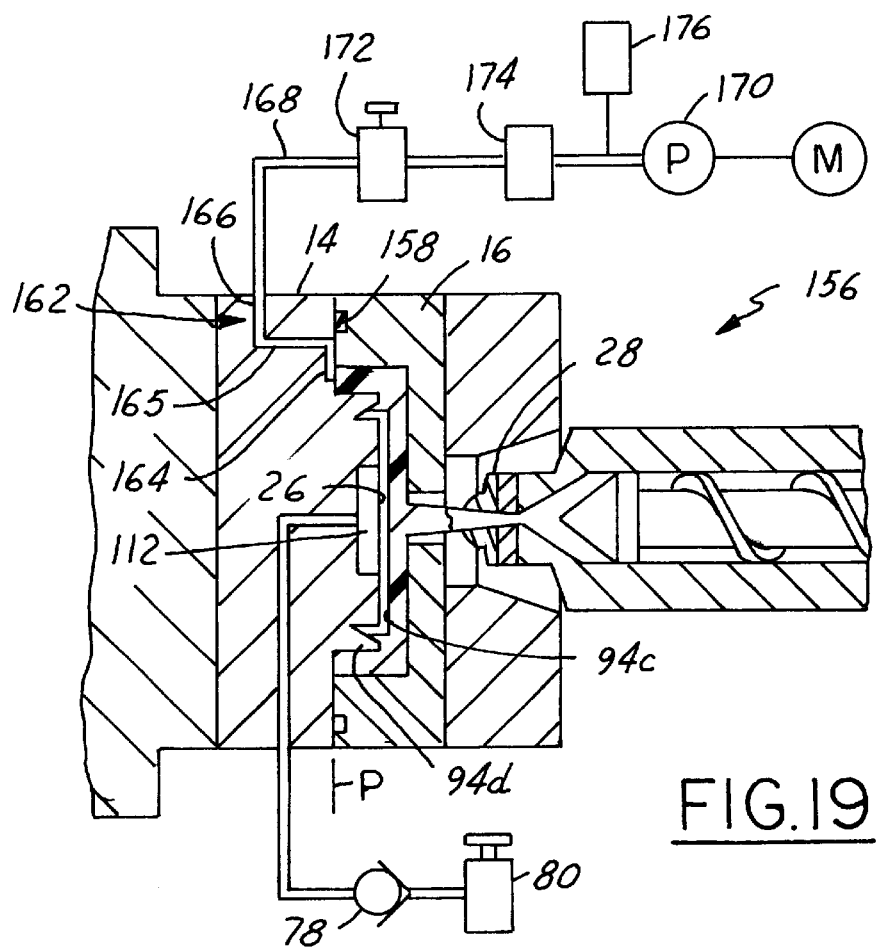
FIG.19
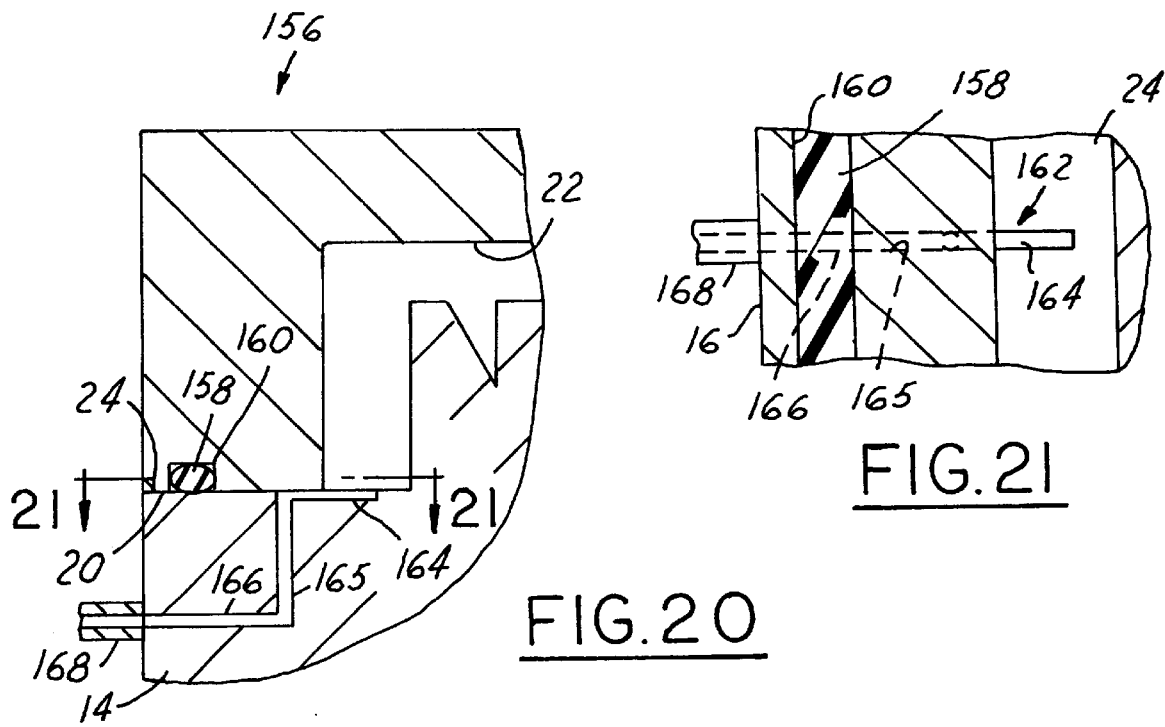
FIG.20
FIG.21

METHOD FOR FLUID COMPRESSION OF INJECTION MOLDED PLASTIC MATERIAL

CROSS-REFERENCE TO RELATED APPLICATION

This application is a continuation-in-part of application Ser. No. 08/240,910, filed May 11, 1994, now abandoned, which is a continuation-in-part of application Ser. No. 08/083,382, filed Jun. 28, 1993, now abandoned, which is a continuation of application Ser. No. 07/961,615, filed Oct. 15, 1992, now U.S. Pat. No. 5,344,596, each application being based upon application Ser. No. 07/855,236, filed Mar. 13, 1992, now abandoned.

BACKGROUND OF THE INVENTION

The present invention relates to a method and apparatus for fluid compression of flowable plastic material following injection of the plastic into a mold cavity whereby to form a solid injection molded part having no internal voids, that is substantially strain fee, and has a Class A finish and sink-free surface.

Injection molds typically comprise stationary and moving mold halves (i.e., the core side and cavity side) which are closed and clamped together to form a mold cavity therebetween for shaping articles from thermoplastic compositions. The thermoplastic is heated into a molten condition and injected under pressure through a nozzle and into the mold cavity by means of a screw ram. Injection pressures of 2,000 to 10,000 psi are common at the gate locations. The plastic is allowed to cool to sufficiently harden the thermoplastic whereupon the mold is opened and the hardened articles removed.

A traditional plastic molding problem is the formation of surface distortions or "sink marks" on the appearance side caused by ribs or bosses on the backside of a part resulting from the volume contracting (i.e., shrinkage) of the plastic during cooling. Further, warpage or part distortion can result from the high injection pressures used to fill the cavity, the pack out pressure, or from an uneven pressure gradient resulting from the injection pressure at the gate being higher than the pressures at the extreme ends of the molding. High injection pressures can cause strain marks or molded in strain in the hardened article, resulting in warpage at once, or over a period of time after molding, or if the end use of the molding is in a high temperature area. When ribs are formed in the molding, due to a shrinkage differential, the wall thickness versus rib configuration can cause the ribs to buckle or bend the molding. In large projected area moldings where the plastic cannot flow from the gate to the end of the molding, hot runner molds are needed and high clamping forces (e.g., 1,000 to 5,000 tons) are required to hold the mold halves together. These molds are costlier to build, and the runners can add a weld line to the product. Machines which can provide these high clamping forces are costly to operate.

In what has come to be known as "gas assisted injection molding" an inert gas is injected through the plastic injection nozzle and directly into the thick areas of the melted thermoplastic, whereby to create hollow sections in the part. With the gas assisted molding process, sink marks and warpage can be minimized, and possibly eliminated. The gas is directed through a hollow (.e., gas channel) of the material formed between the surface of the part and a backside detail, such as a rib. If so, the base of the rib must be made thicker to help direct the gas channel, which is just the opposite of normal design practice with plastic where ribs are made as thin as possible to try and eliminate shrinkage. With the gas channel at the base of a rib, material will shrink away from the inside surface of the channel as the molded part cools because the material is the hottest at the center of the section. Therefore, as the plastic part shrinks during cooling, the sink mark on the visible outside surface is minimized.

A disadvantage in such gas assisted molding operations is that the gas pressure within the channels must be released prior to opening the mold, which normally requires costly post molding steps of venting the pressurized gas to atmosphere and then sealing or finishing this hole. Oftentimes sealing of this vent hole is needed, such as where the appearance or function of the part is affected, or to obviate the possibility of the part contaminating various chemical baths during secondary operations, such as chrome plating or painting.

Additionally, the possibility of achieving a Class A surface is inhibited by shadow marks caused by gas holes in the thicker areas of the molding, and gas permeation caused by the gas not being retained in the thicker areas and overflowing into the wall thickness of the molding. This causes thinning and weakening of the wall, raised areas, and blush marks.

In the gas assisted process, the gas used during the molding operation can be recovered to some extent but the chances are it will be full of volatiles from the molded polymer which would need to be removed. However, there are dangers in compressing inert gas with a volatile gas (e.g., fire).

Additionally, with gas assistance, costly apparatus is needed in the form of gas compression units, nozzles, pins and the like to introduce the gas into the molding. Further, to operate these units at the high pressures needed (e.g., 9,000 psi) is energy costly, the gas used and lost is costly, and the cost of maintenance is high.

Injection molding of parts utilizing a pressurized gas source is shown in "Injection Mold Method and Apparatus," published Jun. 14, 1990 as PCT Publication WO 90/06220, the specification being specifically incorporated herein by reference. While this process is suitable for molding articles of the type shown therein, there is always a need for improvements in forming low cost articles.

The primary objects of this invention are to provide a method and apparatus which enhances the low cost production of a plastic molded part which is stress-free, has a Class A surface condition, is free of "sink marks" or "blush marks", and has no gas internally in the part or voids internally of the plastic, avoids permeation and witness lines, does not require venting the fluid pressure within the molded part, provides a constant gas pressure across an inner surface of molten plastic used to form the mold part, and allows for the reclaiming of the fluid (i.e., gas) with reduced volatile content for reuse in the process.

A further object of this invention is provision of a self-sealing arrangement during molding and curing to prevent air in the mold cavity or the forming gas from either migrating around the thermoplastic. Undesirably, this gas could force the molten plastic away from the mold cavity surface used to form the finished surface or escape across the parting line of mold sections and pass outwardly from the mold cavity.

According to the self-sealing aspect of this invention, a continuous groove (or recess) is formed in one of the mold cavity surfaces which cooperates to form a gas sealing ring during the introduction of thermoplastic material into the mold cavity, prior to compression molding the thermoplastic.

Advantageously, the gas sealing ring thus formed inhibits unwanted migration of air to the appearance surface.

However, in some applications, if the sealing recess is not substantially completely filled, it is possible that air could be trapped in the sealing recess. If so, a "half moon" can be formed in one corner of the thermoplastic, resulting in entry of air which will push the thermoplastic material away from the sealing recess and thereby allow the air to migrate to the other side of the thermoplastic material.

Accordingly, still another object of this invention is the provision of an arrangement for sealing and evacuating air from the mold cavity and in the gas sealing recess formed in a surface of the mold cavity to less than atmospheric (i.e., a negative pressure) prior to the introduction of a mass of thermoplastic into the mold cavity whereby to ensure that air is not trapped in the gas sealing recess during introduction of the thermoplastic, which trapped air could be forced to the appearance surface of the molded part during introduction of compressed gas.

Another object of this invention is the provision of arrangements for evacuating air in a mold cavity directly from the gas sealing recess.

Still another object of this invention is provision of an arrangement for evacuating air in a mold cavity and a gas sealing recess therein directly via a bleed line adjacent to the gas introduction inlet.

Yet another object of this invention is provision of mold apparatus which eliminates the need for gas channels to communicate gas to remote locations whereby to form free-standing bosses, stiffeners, and other structural details.

A further object of this invention is provision of an injection molded, gas compressed, dimensionally stable, thermoplastic part having reduced wall thicknesses, without the need for either reinforcement ribs, as desired, or internal gas cavities.

Yet another object of this invention is provision of a process that is efficient, requires lesser pressure to form a part, reduces the clamping forces needed to retain the molds together against the pressure, obviates venting, and advantageously uses at least part of the forming pressure to assist in ejection of the finished part upon opening of the mold portions.

Yet a further object of this invention is provision of fluid inlets which are efficient to provide a uniform gas pressure across the inner surface of the injected thermoplastic and are less costly than conventional nozzles and injection valves.

A further object of this invention is provision of a gas recirculation arrangement that enhances the cooling of the part.

SUMMARY OF THE INVENTION

A method of and apparatus for fluid compression of injection molded plastic material are provided to form a strain free part having no internal voids, a Class A finish, and sink-free surface. The apparatus comprises stationary and movable mold portions which has part forming surfaces and are moved from an open to a closed position to define a mold cavity of the shape of the desired part, at least one injection valve for introducing melted thermoplastic into the mold cavity, and at least one gas inlet valve for introducing pressurized gas into the cavity. A continuous sealing groove (or recess) is formed in one of the part forming surfaces and in encircling relation to the gas inlets to receive and form a thermoplastic seal ring which prevents gas from escaping from the mold cavity across the parting line and/or from migrating around the thermoplastic to the appearance side of the thermoplastic.

According to the method of producing a compression injection molded part having no internal voids and a Class A finish, thermoplastic material is introduced into the mold cavity and the sealing groove, a cushion of gas is introduced into the mold cavity at a selected location to apply an external pressure on one side of the thermoplastic material which moves the thermoplastic material at that location inwardly of the mold cavity and away from the adjacent mold cavity surface, and maintaining the external pressure until the thermoplastic is self supporting.

According to this invention, prior to the step of introducing the thermoplastic material into the sealing groove, the air in the sealing groove is reduced to a pressure below atmospheric whereby the sealing groove substantially entirely fills with thermoplastic without trapping air therewithin. In one embodiment, the sealing groove is evacuated via a bleed line extending from the mold cavity and in part between the parting plane of the mold portions, the parting plane otherwise being clamped in airtight relation. In another embodiment, the sealing groove is evacuated by a bleed line opening directly onto a wall thereof. In another embodiment, the sealing groove is evacuated in part by a configured sealing pin clearance fit in a shaped bore opening into the groove.

The pressurized gas, such as nitrogen, operates to uniformly force the molten thermoplastic away from one mold portion and against the other mold portion to form the finished outer surface of the part.

Advantageously, evacuating the sealing groove prior to introducing the molten thermoplastic will ensure that the thermoplastic will not trap any air in the sealing groove which could otherwise prevent the sealing groove from filling completely or cause weak spots to form in the gas seal ring. This can be important because even if the mold cavity is vented to let the air which might otherwise escape to the other side of the seal ring, the air pressure in the mold cavity will increase inasmuch as the air cannot evacuate the mold cavity fast enough to obviate an increase in air pressure, which pressure could stop the sealing groove from completely filling.

Preferably, and according to this invention, the stationary portion (i.e., the core side) can include a plurality of recesses to form free-standing bosses, or an upwardly extending core body having a plurality of rib forming chambers that fill with thermoplastic. The chambers form ribs on the inner side of the part and these ribs can be continuous, interrupted, and used in combination with the recesses to form free-standing bosses. Additionally, the walls of the rib forming chambers can be provided with a stepped portion to form an increased volume area for the plastic to flow into to drive the plastic outwardly whereby to inhibit shrinkage of the part and separation of its exterior appearance surface from contact with the mold cavity surface.

Advantageously, the method and apparatus herein allows formation of free-standing bosses and ribs without the need for gas channels which extend thereto, as is needed with traditional gas assisted injection molding. This allows flexibility in design whereby all ribs that are not needed for strengthening the molding, but are only there to inhibit shrinkage in remote areas of thick sections of the mold, can be eliminated.

Further, moldings can be made using low pressures and low clamping forces, and eliminating the need for hot runners.

Advantageously, the pressurized gas uniformly urges the plastic away from one of the mold portions and against the other mold portion to inhibit shrinkage of the molded part from contact with the mold surface of the other mold portion, and can also be used to eject the part from the mold cavity, whereby to obviate the use of ejector pins which can cause surface indentations.

Advantageously, control over the gas utilized can be reclaimed to save energy costs and gas costs, and recirculated to enhance cooling and reduce time required for the molds to cool between cycles.

A further advantage of a mold apparatus having the rib forming channels is provision of a reinforced structural part while providing a surface having a sink-free Class A finish free of permeation marks, blush marks, etc.

Additionally, gas compression of injection molded plastic allows formation of structural parts of thin and thick cross-sections.

BRIEF DESCRIPTION OF THE DRAWINGS

Other objects, features and advantages of the invention will be apparent from the written description and the drawings in which:

FIGS. 19–21 are views, partially in section, of a mold apparatus, according to another aspect of this invention, utilizing an arrangement to lower the pressure in a sealing groove of the mold cavity prior to the injection compression molding process.

DETAILED DESCRIPTION OF THE PREFERRED EMBODIMENT

Figure 1:
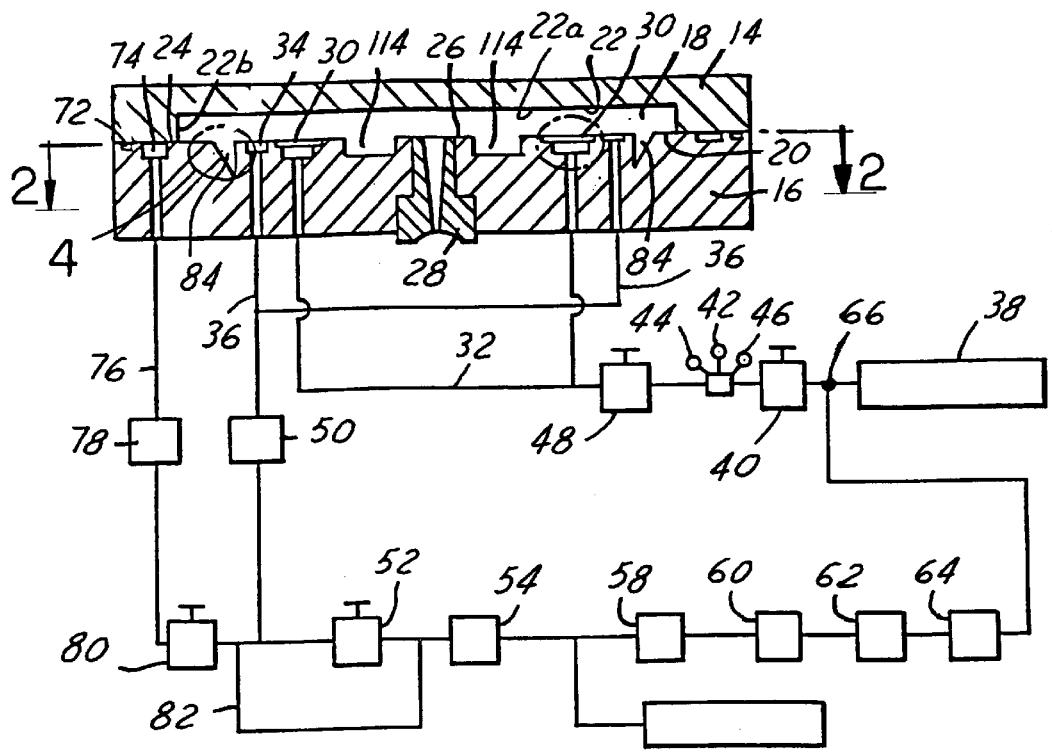
FIG. 1 is a sectional elevation view, in accordance with this invention, taken through a portion of an injection mold apparatus in a closed position to form a mold cavity and showing a recycling system to remove, save and reuse the gas.
Figure 2:
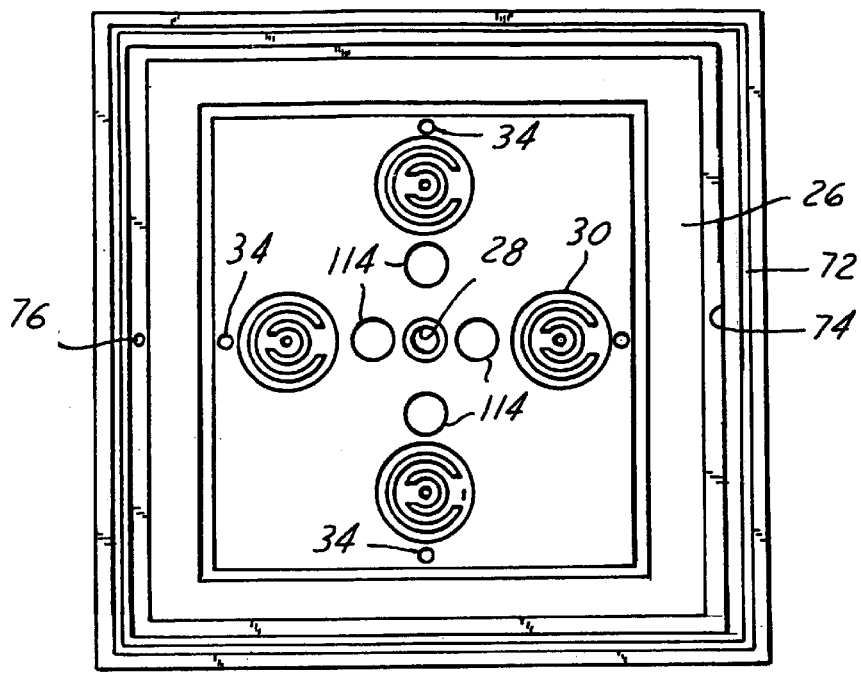
FIG. 2 is a plan view taken through the parting line of the apparatus along line 2—2 of FIG. 1, showing the stationary core side of the mold apparatus.

Referring now to the drawings, in accordance with this invention, a mold apparatus is used to form a structural part having a finish sink-free Class A exterior surface. It is to be understood that the invention could be used to form parts having different configurations, such as with reinforcing ribs, or without reinforcing ribs, or with free-standing bosses, or with reinforcing ribs and free-standing bosses or in combination with other structural detail, such as wall portions. Additionally, in the practice of the invention the gas can be introduced from either or both sides of the mold cavity, such as where the plastic is introduced laterally.

Figure 3:
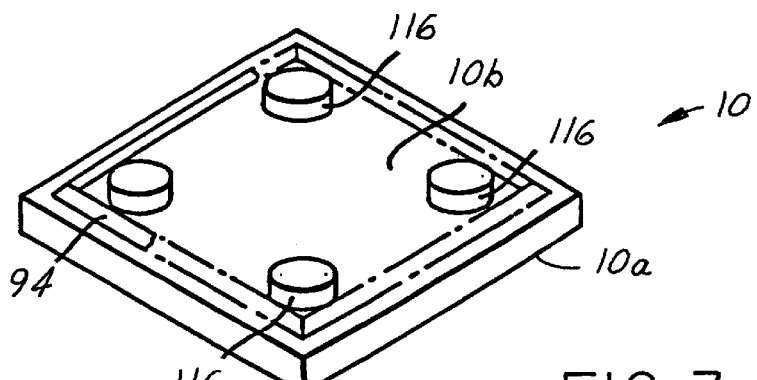
FIG. 3 is a perspective view of the bottom surface of an injection compression molded part made in accordance with the injection mold apparatus of FIG. 1.

Turning now to FIGS. 1 and 3, in accordance with this invention, a part 10 is formed by a mold apparatus 12. The mold apparatus 12 comprises movable and stationary mold portions 14 and 16 which are relatively movable between an open position (not shown), whereby the mold portions are spaced from one another the finished part 10 can be removed, and a closed position (as shown). When the mold portions are in the closed position, the mold portions cooperate to define a mold cavity 18 for forming the part 10. While not shown, the stationary mold portion is fixed to a conventional molding machine and a conventional screw ram to receive melted plastic material injected into the mold cavity 18. Further, a clamping arrangement is connected to the mold portions for holding the mold halves together when in the closed position. The screw ram and clamping arrangement are conventional and would be understood by those skilled in the art. Illustrative are the arrangements described in the hereinabove incorporated PCT WO 90/06220.

The movable mold portion 14 has a bottom surface which comprises a first surface portion 20 which is exterior to the mold cavity and a second surface portion 22 which defines the interior of the mold cavity and forms the finished appearance surface of the desired part. As shown, the interior surface portion 22 comprises a flat upper wall 22a and an endwall 22b.

The stationary mold portion 16 has a top surface which comprises a first surface portion 24 which is exterior to the mold cavity and forms a support surface for the corresponding exterior surface portion 20 and a second surface portion 26, the exterior first surface portions 20 and 24 defining a parting line "P". The mold cavity 18 is defined by the interior surface portions 22 and 26, which are confronting. A plastic sprue bushing 28 is positioned to allow injected melted thermoplastic resin through the surface 26 and into the mold cavity. The volume of melted plastic is of a predetermined amount to substantially fill the mold cavity but of a volume less than that necessary for a complete packing. Although the volume injected could be between 90–99.9% of the total volume of the cavity, in one application, the plastic filled about 97.4% of the mold cavity total volume.

An inert pressurized gas, such as nitrogen, is injected into the mold cavity 18 through one or more gas inlets 30 located in the surface 26 of the stationary mold portion 16, whereby to pressurize the core side of the cavity and force the melted plastic material against the surfaces 22a and 22b of the movable mold portion 14. Preferably, to assure uniformity of resin distribution, the gas inlets are generally symmetrically disposed and each is connected via a gas inlet line 32 to a gas source at a predetermined pressure. While each gas inlet is shown separately connected to a common surface, each inlet could be connected to a separate pressure source.

In accordance with the important aspect of the invention, a plurality of gas outlets 34 are provided (1) to reduce pressure in the cavity, and (2) cool the part by allowing recirculation of the gas used in compression of the hot melted thermoplastic. The outlets 34 communicate with the cavity 18 via the surface 26 and allow gas to pass outwardly of the cavity via the return lines 36.

Nitrogen gas is supplied to the inlet line 32 from a source of nitrogen, shown by the pressurized bottle at 38. The bottle 38 includes a shutoff valve 40, a regulator 42, and gages 44 and 46 respectively to indicate the process pressure and pressure in the bottle. Gas is supplied at the desired pressure via an electrically operated directional control valve 48.

A gas recycle system to remove, save and reuse the gas during and following the molding operation is provided. The return lines 36 are connected together and, in series, to a check valve 50, gas directional valve 52, a pressure reducing valve 54 and a nitrogen receiver 56. A pressure switch 58 connects the nitrogen with a cooler 60, such as a heat exchanger, a pump 61, a check valve 64, and into the supply 38 at 66. The pump 62 is used to compress (i.e., pressurize) the gas from the cavity and resupply cooled and pressurized nitrogen directly to the system. In one operation, the nitrogen gas from the source 38 was pressurized by the pump to 2,400 psi and the regulator 42 was set at 1,000 psi.

In accordance with the recapture aspect of this invention, a pair of concentric outer and inner grooves 72 and 74 are formed in the surface 24 of the mold portion 16. The outer groove 72 is sized to receive an O-ring to be compressed by the surfaces 20 and 24 and form a gas seal about the mold cavity. The inner groove 74 communicates gas in the cavity which was heated by contact with the plastic with a low pressure outlet return line 76 to the nitrogen receive 56 via a pressure reducing valve 78, and a directional control valve 80. If desired this gas can be communicated directly into the directional valve 50, or bypass the valve 50 via bypass line 42.

Preferably and in accordance with this invention, FIGS. 4A–4B, 5A–5B, 6A–6B, 7 and 8 show a gas seal arrangement utilized to prevent gas from escaping from the mold cavity or migrating to the outer surface of the thermoplastic. After the plastic is injected into the cavity, the plastic will tend to shrink. If the injected gas should migrate from the "inner" gas compression side of the thermoplastic and into the interface formed between the mold cavity wall formed by 22a and 22b, which surfaces define the shaped finished exterior appearance surface of the part 10 (i.e., the "outer" compressed surface of the plastic), the gas will force the plastic away from the mold and destroy the formation of the Class A surface. To inhibit this from happening, a continuous recess is formed in the mold portion 16, at a remote location of the surface 26 from which gas is introduced into the cavity, and in encircling relation to the gas inlets 30. The recess will receive the thermoplastic during injection of the thermoplastic into the cavity, whereupon the thermoplastic will harden during cooling to form a continuous ring. During the cooling phase, the gas continuously forces the molten plastic against a surface of the recess to inhibit gas escape from the mold cavity, such as via the parting line closure between the mold portions.

Figure 4A:
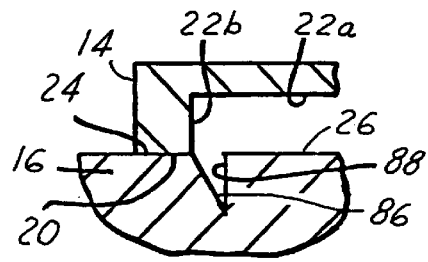
FIGS. 4A and 4B are sectional elevation views, before and after plastic injection, taken about line 4 of the mold apparatus of FIG. 1, showing formation of a gas seal arrangement to prevent gas from escaping from the mold cavity via the mold parting line or migrating from the core side to the finished surface of the part.
Figure 4B:
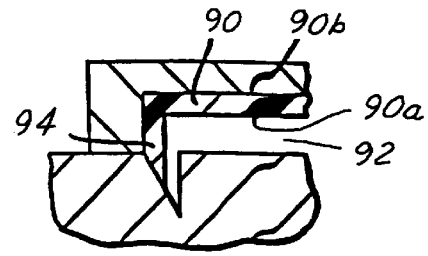

In the embodiment shown in FIG. 4A, a continuous V-shaped recess 84 is formed in the surface 26 of the mold portion 16 so as to be in encircling relation to the gas inlets 30, as well as the gas outlets 34. The recess 84 includes an inclined wall 86 which extends downwardly from the surface 26, and inwardly towards the gas inlets whereby to intersect with a vertical wall 88. In FIG. 4B, heated, melted, flowable thermoplastic 90 has been injected into the mold cavity and, in part, into the recess 84. The pressurized gas forces the outer surface 90b of the plastic toward the surfaces 22a and 22b, and forms a reduced gas cavity 92 between the surface 26 and the inner surface 90a of the thermoplastic. During cooling and while the pressure is maintained, the gas cavity part will undergo some shrinkage. However, escape of gas from the mold cavity is prevented by the action of the gas constantly forcing the plastic material against the inclined wall 86, resulting in a seal ring 94. As shown in FIG. 3, the gas seal ring is formed on the back side 10b of the part 10.

Figure 5A:
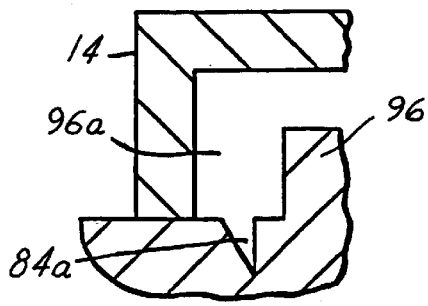
FIGS. 5A and 5B, 6A and 6B, 7 and 8 illustrate additional preferred embodiments of a gas seal arrangement.
Figure 5B:
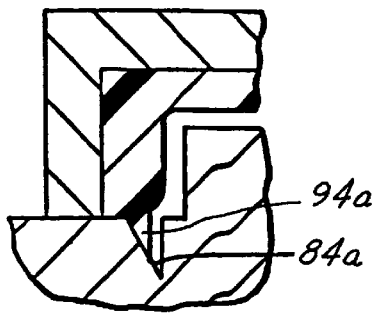

FIGS. 5A and 5B show the mold portion 16 as including a core body 96, an annulus 96a being defined between the core body and the movable mold portion 14, and a continuous V-shaped recess 84a being formed in the surface 26. Plastic driven into the recess 84a forms a seal ring 94a that prevents gas from escaping from the mold cavity or reaching the finished surface.

Figure 6A:
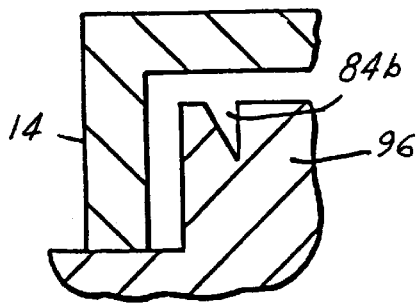
Figure 6B:
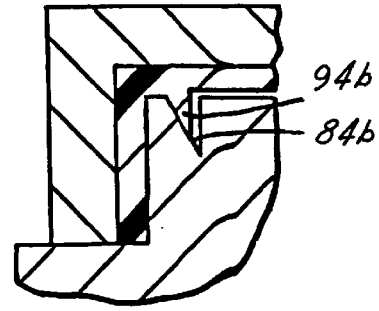

FIGS. 6A and 6B show a continuous V-shaped recess 84b being formed in an upper surface of the core body 96. In this embodiment, a cake-pan shaped article can be formed, such as that described in connection with the FIGS. 11–14. A gas seal ring 94b would be formed on a back side of the part and at an unseen location adjacent to the junction between the flat and cylindrical walls of the part.

Figure 7:
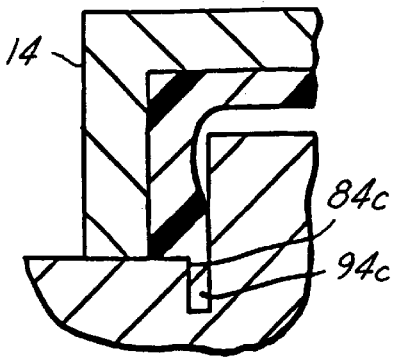

FIG. 7 is similar to that described in connection with FIG. 4A and shows a continuous "squared" recess 84c extending vertically below the parting line. Thermoplastic is forced into the recess to form a continuous annular wall, whereby to form a seal ring 94c which prevents gas escape from the mold.

Figure 8:
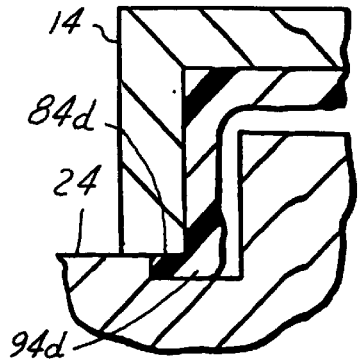

FIG. 8 is similar to that described in connection with FIG. 5A and the gas seal ring is formed by a flat, shallow annular recess 84d in the surface 24 and extending below the parting line surface "P", and located in part under the mold portion 14 and in the mold cavity. The annular recess 84d receives plastic and forms a continuous gas seal ring 94d. This ring would be "flash" that would be removed in a post-molding operation.

Figure 10:
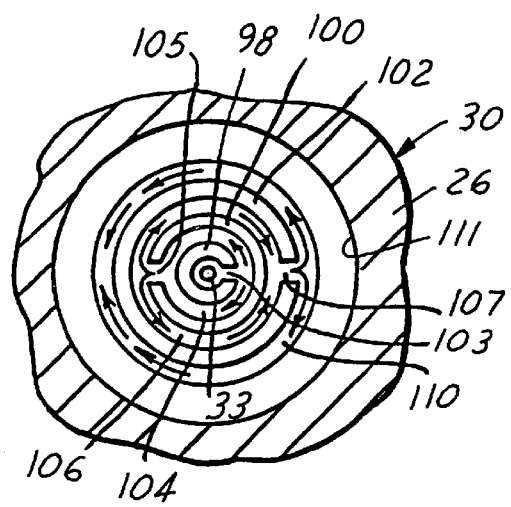
FIGS. 9 and 10 are sectional elevation and plan views, taken about line 8 of the mold apparatus of FIG. 1, showing detail of a gas inlet in accordance with this invention.
Figure 9:
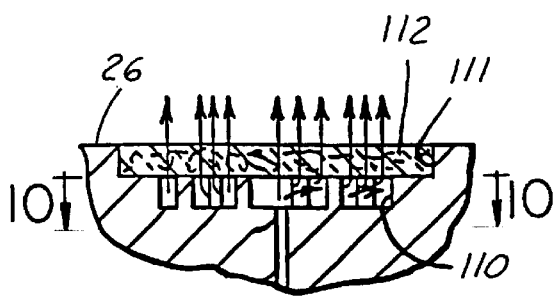

FIGS. 9 and 10, in accordance with another important aspect of this invention, show details of the novel gas inlet 30 to provide gas to the mold cavity. A plurality of concentric C-shaped wall sections 98, 100, and 102 (and associated gas passages 104, 106, and 108, extending cylindrically, and passages 103, 105, and 107, extending radially) are disposed in concentric relation in the surface 26 and the gas line 32 has its opening 33 located centrally of the central wall section 98. The wall sections are located in a chamber 110 which is in a recess 111 below the surface 26 and covered by a circular porous sintered metal disk 112. As shown, the inner and outer of the C-shaped wall sections 98 and 102 have the radial passages 103 and 107 face in a direction oppositely to the direction of the radial passage 105 of the center C-shaped wall section 104. This arrangement advantageously results in a greater velocity of gas flow axially and in a swirling movement of the gas around the gas passages, which has a beneficial result on the finished surface of the part as a result of improved circulation of the gas.

The disk 112 could be of any suitable density, consistent with the pressure drop desired (i.e., a lower micron opening, the greater the pressure drop, and vice versa). While it is believed the filter disk could be between 2–40 microns, a 5 micron filter disk was found preferable.

While discrete gas inlets are shown, it is to be understood that to accomplish uniform gas pressure over the inner surface of the thermoplastic, the entire surface 26 of the stationary mold portion 16 could be provided with a series of interconnected gas flow passages and one or more associated gas inlets 33. Although a porous metal disk is described herein, a poppet valve of the type shown by the hereinabove incorporated PCT Publication No. WO 90/06220 can also be used.

Another important feature is the capability of forming free-standing structural parts, such as reinforcement ribs or bosses needed for attachment. As shown in FIG. 1, a plurality of cylindrical recesses 114 are formed in the surface 26, which cooperate to form a corresponding series of bosses 116 which project from the bottom surface of the molded part.

The part 10 formed by the apparatus of FIGS. 1–10 is shown in FIG. 3, including on the rear (i.e., bottom) surface 10b the seal ring 94 and a series of bosses 116 encircled by the ring. The top surface shown at 10a defines the exterior appearance surface having a sink-free, Class A finish.

Figure 11:
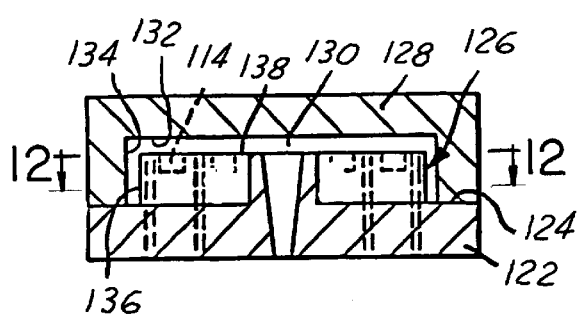
FIG. 11 is a sectional elevation view, in accordance with this invention, of another embodiment of an injection mold apparatus, particularly for providing discontinuous reinforcement ribs.
Figure 12:
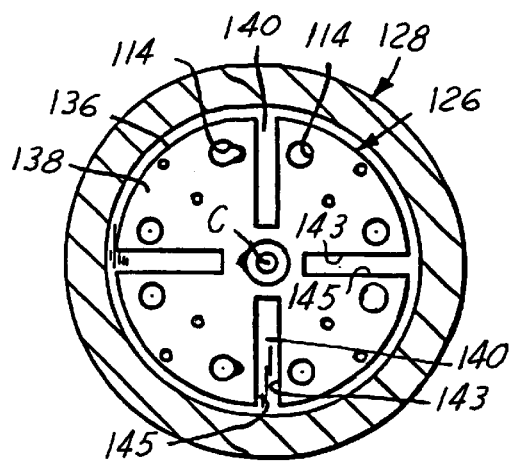
FIG. 12 is a plan view taken along line 12—12 of FIG. 11 showing the stationary core side of the mold apparatus.
Figure 13:
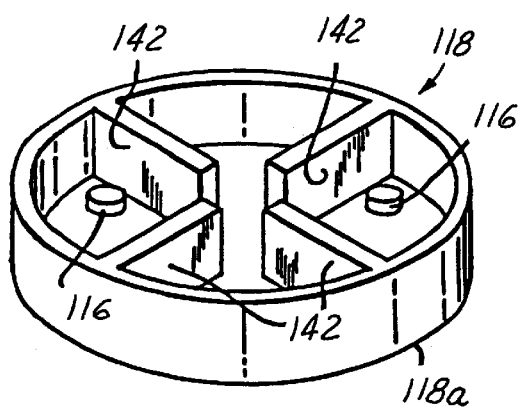
FIG. 13 is a perspective view of the bottom surface of a part made in accordance with the apparatus of FIGS. 11 and 12.

In accordance with this invention, a cake pan article 118 is made from a mold apparatus 120 shown in FIGS. 11–13. The apparatus comprises a stationary mold portion 122 that includes a support surface 124 and a cylindrical core body 126 extending upwardly therefrom, and a movable mold portion 128 having a recess sized to receive the core body 126 and form a mold cavity 130 therebetween. The mold portion 128 includes flat and cylindrical surfaces 132 and 134 that form the finished outer appearance surface 118a of the part. The core body 126 is generally cylindrical and includes an outer cylindrical surface 136 which confronts the cylindrical surface 134 and an upper flat surface 138 which confronts the flat surface 132. The cylindrical and flat surfaces 136 and 138 form the interior surface 118b of the cake-pan shaped part 118.

Preferably and in accordance with this invention, a plurality of rib forming chambers 140 are provide in the core body 126 for forming associated planar ribs 142 in the part 118. As shown, four chambers 140 extend radially inwardly from the outer cylindrical surface 136 and axially downwardly from the flat surface 138. The chambers stop short of the geometrical center "C" of the core body and define a pair of spaced-apart parallel sidewalls 143 and 145 and the separation between the sidewalls is about equal to or slightly less than the thickness of the cylindrical wall of the part 118 (i.e., the distance generally defined between the inner and outer surfaces 134 and 136 of the cavity). The chambers generally divide the core body 126 into four equal quadrants, each chamber being adapted to receive plastic injected into the mold cavity and each forming discontinuous ribs 142.

The upper flat surface 138 of the core body 126 could, if desired, include appropriate recesses 114 for forming free-standing bosses 116, as described in connection with the part 10. Further, the outlet from the sprue bushing 28, and the gas inlets 30 would also be provided on this surface. The inlets for the gas and plastic could be otherwise.

The structural part 118 made from the apparatus 120 comprises a cake-pan shaped member comprising a flat endwall in the form of a generally circular plate having inner and outer surfaces, a sidewall in the form of a cylindrical skirt having concentric inner and outer surfaces, a plurality of free standing bosses 116 projecting from the interior surface 118b of the endwall, and a plurality of planar ribs 142. The ribs 142 are integrally formed with the flat endwall and the cylindrical skirt and each extends generally perpendicularly downwardly from the inner surface of the endwall and radially inwardly from the inner surface of the skirt.

An important feature herein resides in the relationship of the ribs 142 to the cylindrical sidewall and flat endwall. During gas compression, to be described, the material used to form the ribs enhances the dimensional stability of the part 118 and maintains the outer surfaces and in a finished sink-free condition so as to be directly ready for post-molding operations.

Figure 14:
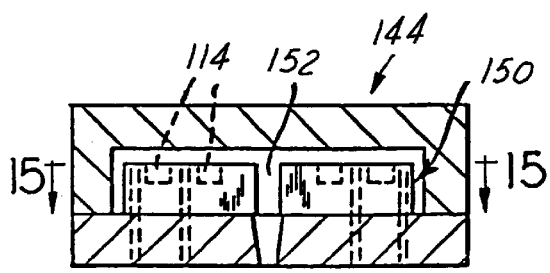
FIGS. 14 and 15 are sectional elevation and plan views, similar to FIGS. 11 and 12, showing an alternate preferred embodiment of the mold apparatus in accordance with this invention.
Figure 15:
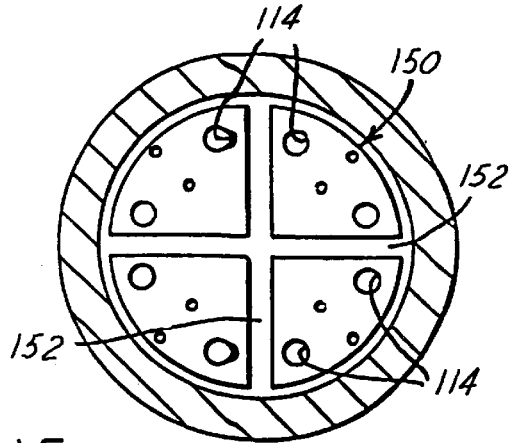
Figure 16:
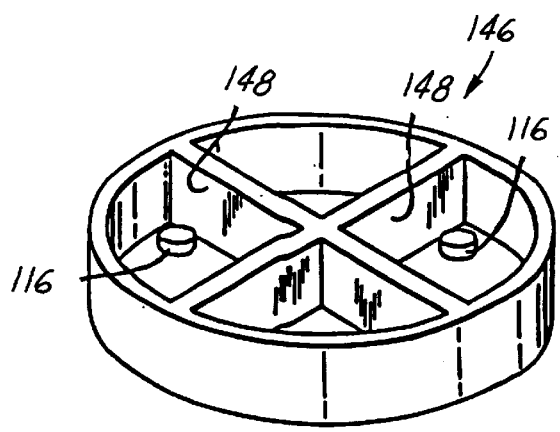
FIG. 16 is a perspective view of the bottom surface of a part made in accordance with the apparatus of FIGS. 14 and 15.
Figure 22:
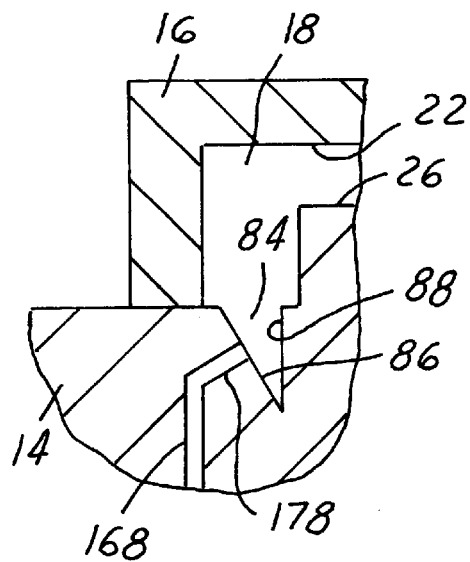
FIGS. 22–23 are enlarged views, partially in section, of another embodiment according to this invention, utilizing an arrangement to lower the pressure in a sealing groove of the mold cavity prior to the injection compression molding process.
Figure 23:
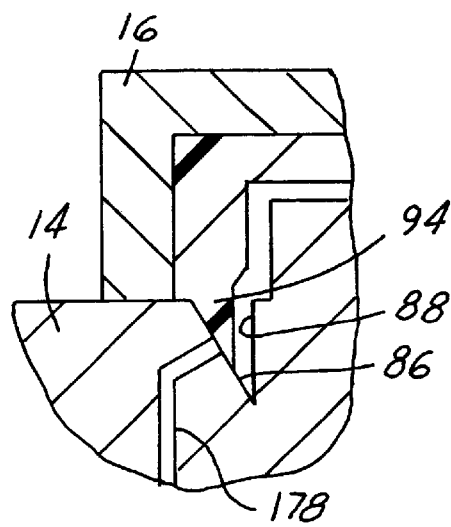

The mold apparatus 144 shown in FIGS. 14–16 forms a part 146 that is similar to the part 118 but is provided with a plurality of reinforcing ribs 148 that are continuous and intersect with one another. The core body 150 comprises four quadrants which define rib forming chambers 152 and has recesses 114 in a top surface thereof for forming bosses 116. As can be appreciated, the method herein is not restricted to the use of discontinuous ribs, such as those shown at 142 on the part 118. Importantly, both free-standing ribs 148 and bosses 116 can be provided.

Figure 17:
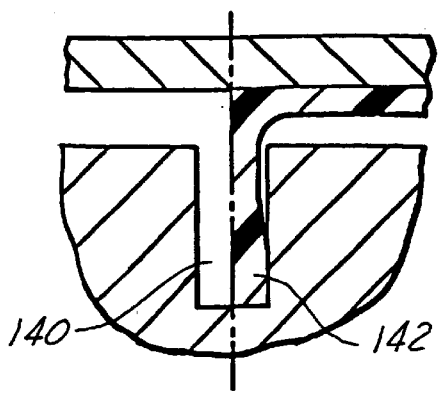
FIG. 17 is a sectional elevation view taken along line 16—16 of FIG. 12 showing a rib forming chamber divided into two halves, respectively, before and after thermoplastic and gas are introduced into the mold cavity.
Figure 18:
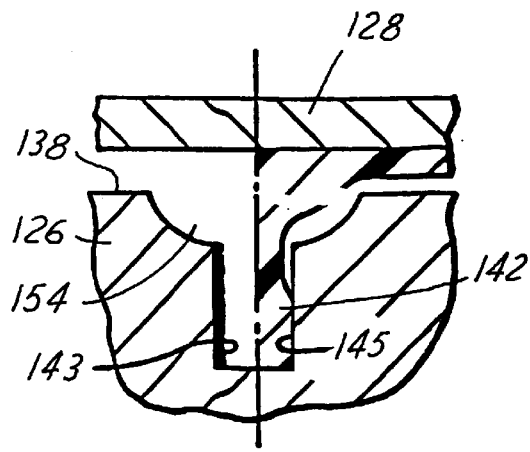
FIG. 18 is similar to FIG. 17 and shows an alternate embodiment of a rib forming chamber having a gas tributary.

FIGS. 17 and 18 show the rib forming chamber 140 as being generally rectangular and illustrate the formation of a rib 142. In each of these figures, the chamber 140 is split into right and left halves to show the chamber before and after plastic injection.

In the right half of FIG. 17, a quantity of melted plastic compression has been injected into the mold cavity and into the rib-forming chamber 140. Pressurized gas introduced into the cavity thereafter drives against the inner surface of the melted plastic and drives the plastic against the mold portion and into the chamber, whereby to form the rib 142. Thereafter, the pressure is maintained and the part allowed to cool. During cooling of the thermoplastic, the pressurized gas assures that the finished surface of the part does not have any "sink marks" resulting from material contraction adjacent the rib chamber. The gas pressure constantly forces cooling material upwardly towards the wall surface of the upper mold portion whereby to inhibit shrinking of the material adjacent the rib 142 during cooling of the part.

In FIG. 18, in accordance with another aspect of this invention, the flat surface 138 of the core body 126 is shown being provided with a "step" whereby each rib forming chamber 140 is formed with an increased plastic volume area 154 for the plastic to flow into to drive the plastic radially outwardly and vertically upwardly against the interior surfaces of the movable mold portion. In the embodiment shown, arcuate C-shaped surface portions extend downwardly from the core surface 138 and into each of the two respective sidewalls 143 and 145 of the chamber, the surface portions forming the recessed step 154. The gas surface portions could be otherwise, such as forming a "squared step" portion.

There are no restrictions on the thermoplastic resins that can be used in the practice of the method herein. By way of illustration, the method can be applied not only to general purpose plastics such as polyolefins, polystyrene, ABS resins, AS resins, PVC resins, methacrylic resins and flourine-based resins but also engineering plastics such as nylon, saturated polyester resins, polycarbonate resins, polyacetal resins, polysulfones and modified polyphenylene ether resins. For example, suitable ABS thermoplastic compositions would be the relatively hard polymers, such as Cycolac, a trade name of General Electric, or Krylastic, a trade name of Uniroyal.

In the method, the mold portions are closed, and the electrically controlled directional valves 48, 52, and 80 are de-energized (i.e., are closed). Hot melted, flowable, thermoplastic is injected through the sprue bushing 28 and into the mold cavity 18, into the shaped recess 84, as well as into the recesses 114 and chambers 142, where such are provided. The plastic injected will be in an amount of nearly completely fill the cavity, but not fully pack the cavity. Immediately thereafter, or after a timed delay, the directional control valve 48 is energized (i.e., opened) which will allow gas at the desired pressure from the bottle 38, to pass through the inlet lines 32, through the gas inlets 30, and into the mold cavity. The inert gas would be supplied at a pressure sufficient to urge the plastic to the opposite side of the mold from the gas inlet to completely form a solid molding having no internal voids, devoid of all shrinkage and strain marks. Before the polymer cools, gas will drive the melted plastic towards and against the respective walls of the mold recesses and chambers.

The pressure is maintained for 1–15 seconds, whereupon the gas directional valve 48 is closed (i.e., is de-energized), which stops any further gas from entering the cavity and the part allowed to compression-harden under the action of the gas. The gas seal ring 94 inhibits escape of as from the cavity. The time period is sufficient to ensure that the entire "inner" surface of the plastic on the gas inlet side has sensed the equal pressure and lifted the plastic form the core side of the mold.

If it should happen that gas should pass beyond the seal ring 94 to the groove 74, the O-ring in groove 72 will stop its migration. The directional valve 80 can be energized (i.e., opened), which will direct the heated high pressure gas through the return line 76 and along the path 82, around directional valve 80, and into the nitrogen receiver 56. The heated gas can be stored for reuse. Valve 80 is then de-energized (i.e., closed).

The initial gas forming pressure can be reduced to a second lower pressure, in continuous steps or intermittently, to make sure that the molding is not subject to too high a pressure during the transition from the liquid state to the solid state. This is where strain can be introduced into the molding. The reduced second pressure would still be sufficient to prevent sinkage. The heated gas removed from the mold cavity can be captured, cooled, and recycled.

Accordingly, after a predetermined time, the directional valve 52 is energized (i.e., opened). The heated gas will then pass through the outlet 34, and through the directional valve 52, and into the nitrogen receiver 56.

Additionally, the gas in the mold cavity, heated by contact with the part, desirably can be removed, cooled, and pressurized, and reintroduced as fresh ambient gas into the cavity, while maintaining the desired pressure in the mold cavity, thereby continuously recirculating the gas to provide a cool gas flow to cool the plastic and inhibit sinkage. Without cooling of the heated plastic, sinkage can result. In this regard, the directional valves 48, 52, and 80 are energized. The switch 58 is tripped at a predetermined pressure, and the pump 62 started to raise the return gas pressure to the pressure in the bottle 38.

Following hardening of the part, the mold portions 14 and 16 are separated, whereby trapped nitrogen gas will eject, or help eject, the molding. Advantageously, this obviates any marks being formed on the surfaces as may be caused by ejector pins.

While not shown, conventional apparatus is provided to control the level and duration that the pressurized gas is maintained.

In the realization of this invention, conditions such as the temperature of the molten resin during injection molding, the injection pressure, and injection speed; the injection gas timing, quantity pressure and speed; and the mold cooling time, will be selected and controlled in relation to the kind of resin being used and the shape of the mold cavity, and thus cannot be unconditionally specified. Examples are described below to illustrate the present invention.

In one sample, a cake-pan shaped part similar to that shown in FIGS. 14–16 (having discontinuous stiffening ribs) was formed. About 1–5 seconds after the ABS was injected into the mold cavity, and preferably about 2.5 seconds thereafter, the plastic injection nozzle valve was closed and Nitrogen gas between 500–1,000 psi, and preferably about 650 psi, was introduced for about 5.0 seconds into the mold cavity. The gas inlet was then closed and the gas held for a period of about 30–60 seconds, and preferably about 40 seconds. Thereafter, the part was ejected.

In a second example, polypropylene was injected, as stated above, but the Nitrogen gas was between 300–550 psi, and preferably was at 500 psi.

In some applications, as a result of the mass of molten thermoplastic material being introduced into the mold cavity, air could be trapped between the thermoplastic material and the cavity wall of the mold portion against which it is forced, notwithstanding the provision of the seal groove. Since the pressurized gas is applied to one surface of the thermoplastic to move the plastic material at that location inwardly of the mold cavity and toward the other mold portion, any air that was trapped on the other side of the thermoplastic material during its introduction could be forced to the appearance surface of the molded part. Should this happen, the molded part would not have a Class A finish.

According to this invention, FIGS. 19–26 illustrate yet further embodiments of mold apparatus for fluid compression of injection molded plastic to produce a molded part having no internal voids and a substantially sink-free exterior. The mold apparatus is similar to the mold apparatus described hereinabove in connection with FIGS. 1–18 and the specific elements in each will be referred to by the same reference numerals, except where noted.

Importantly, in each of these further embodiments, air in the seal groove (i.e., recess) such as described hereinabove at 84; 84a, 84b, 84c, and 84d is evacuated prior to introduction of the molten thermoplastic resin used to form the molded part and the seal ring and prior to the introduction of a cushion of gas used to force the resin away from one side of the mold cavity and into packed relation against the other side of the mold cavity. The gas seal ring thus formed prevents the gas introduced into the cavity from reaching the appearance surface of the part. However, by evacuating the air from the seal groove before introducing the resin, any air which might otherwise be trapped between the appearance side of the resin and the article defining surface of the mold cavity will be removed. Further, when the body of the resin is compressed by the cushion of gas, the evacuated seal groove will continue to prevent gas from migrating around the seal ring to the appearance surface of the part.

Turning to FIGS. 19–21, a mold apparatus 156 comprises movable and stationary mold portions 14 and 16, and a clamp (not shown) for clamping the mold portions together to form the closed article defining mold cavity 18. The mold portions 14 and 16 include, respectively, the mating surfaces 20 and 24 which are abutted and form the parting plane "P" when the mold portions are clamped together and the part defining surfaces 22 and 26 which form the mold cavity 18.

Thermoplastic material is introduced into the cavity 18 via the sprue bushing 28 located in the stationary mold portion 16 and pressurized gas is introduced into the mold cavity via an opening located in the movable mold portion 14. The thermoplastic is introduced in an amount to fill the mold cavity 18 to form the part and the annular seal recess 84b to form a gas seal ring 94b. The thermoplastic will start to cool and undergo a minor contraction upon contact with the walls of the cavity, thus substantially filling the mold cavity.

Thereafter, in at least one location in the mold cavity 18, pressurized gas is introduced into the mold cavity via the porous sintered metal disc 112 opening on the mold cavity surface 26. The pressurized gas applies pressure on one surface 94c of the thermoplastic material which moves the thermoplastic material at the position inwardly of the mold cavity 18 away from the surface 26 of the mold cavity adjacent thereto and forces the other surface 94d (i.e., the appearance surface) against the opposite walls of the mold cavity. It is to be understood that the gas could be introduced into the mold cavity in more than one location and by other than the porous sintered metal disc 112.

According to an important aspect of this invention, an arrangement is provided whereby the mold cavity 18 can be sealed and the annular seal recess 84b evacuated. As regards the former, a seal ring 158 of compressible elastomeric material is positioned between the mating surfaces 20 and 24 to seal the mold cavity 18 in air tight relation from the atmosphere. As shown, the seal ring 158 is in the form of a conventional O-ring that is seated in a continuous upwardly open annular groove 160 formed entirely in the mating surface 20. It is to be understood that the annular groove 160 could be formed in the mating surface 24, or in part, formed in each of the mating surfaces 20 and 24. When the mating surfaces 20 and 24 are abutted, the seal ring 158 will compress to seal the parting plane "P" and prevent any air or compressed gas from escaping from the mold cavity 18.

Further, air is evacuated from the annular seal recess 84b via a bleed groove 162 communicating with the mold cavity 18. As shown, the bleed groove 162 is formed in part in the mating surface 24 of the movable mold portion 14 and in part in the article forming surface 26 of the mold cavity 18. The bleed groove 162 includes an inlet end portion 164 formed in the surface 25 to communicate gas from the mold cavity 18 to a groove portion 164 thereof extending between the mating surfaces 20 and 24, to a vertical gas passage 165, and then to an outlet end portion 166. Importantly, the bleed groove 162 is dimensioned so as to prevent the entry of or passage of thermoplastic material therethrough.

An arrangement for evacuating the mold cavity 18 includes an outlet line 168 connected at one end to the outlet end portion 166, a vacuum pump 170 powered by a motor "M", a regulator valve 172, and a vacuum chamber 174. The pump 170 is connected to the vacuum chamber 174 and is adapted to develop a "suction force" which will withdraw the air from the mold cavity 18 via the outlet line 168 and reduce the air pressure in the seal recess 84b and the mold cavity 18 below atmospheric (i.e., create a negative pressure). The regulator valve 172 operates one way to permit air to flow from but not flow back into the mold cavity 18. A control sensor 176 is provided, if desired, to determine that a desired pressure has been achieved and maintained. When the pressure deviates, the pump 170 is actuated.

In operation, the mold portions 14 and 16 are clamped together and the mold cavity 18 tightly sealed about the parting line from the atmosphere surrounding the mold apparatus 156. A larger suction force is exerted on the interior of the mold cavity 18 to evacuate the air from the interior of the mold cavity whereby a vacuum is created within the seal recess 84b and the mold cavity 18. The pressure within the mold cavity 18 and the seal recess 84b is reduced to a level between a point below that of atmosphere to approximately 0.9 atm. In one application, a pressure of 0.95 atm was found suitable for this purpose. In another application, a pressure of 0.936 atm was found suitable. In yet another application, a pressure of 0.9 was found suitable.

Substantially simultaneously, after the pressure has been lowered to the desired pressure below atmospheric, the regulator valve 172 is closed, sealing the mold cavity, and molten thermoplastic material at atmospheric pressure is introduced into the mold cavity 18. The hot molten thermoplastic fills the mold cavity and, because of the below-atmospheric pressure of the mold cavity, fills the seal groove 84a. Thereafter, pressurized gas is introduced in the mold cavity to form a gas cushion which presses against one surface of and the thermoplastic material away from the mold portion 14 and the other surface of the thermoplastic material against the mold portion 16. The evacuated seal recess ensures that into air pockets are formed between the outer surface of the thermoplastic and the inwardly facing wall of the seal recess which air could be forced by the compressed gas to the other and appearance side of the molded part.

The pressure is maintained for a period sufficient for the thermoplastic material to cool and solidify in a cooling phase. Thereafter, the mold portions 14 and 16 are separated and the solidified article removed.

According to this invention, and referring to FIGS. 22–25, air is evacuated from the seal groove (i.e., the recess) and the mold cavity 18 via the vacuum arrangement of FIG. 19 but differs in that a bleed line is directly connected to the seal groove. In the arrangement shown in FIGS. 22–23, a bleed line 178 opens on the angled wall 86 of the seal groove 84 and is connected to the outlet line 168. Importantly, the bleed line 178 is dimensioned so as to not permit the passage of thermoplastic material.

Figure 24:
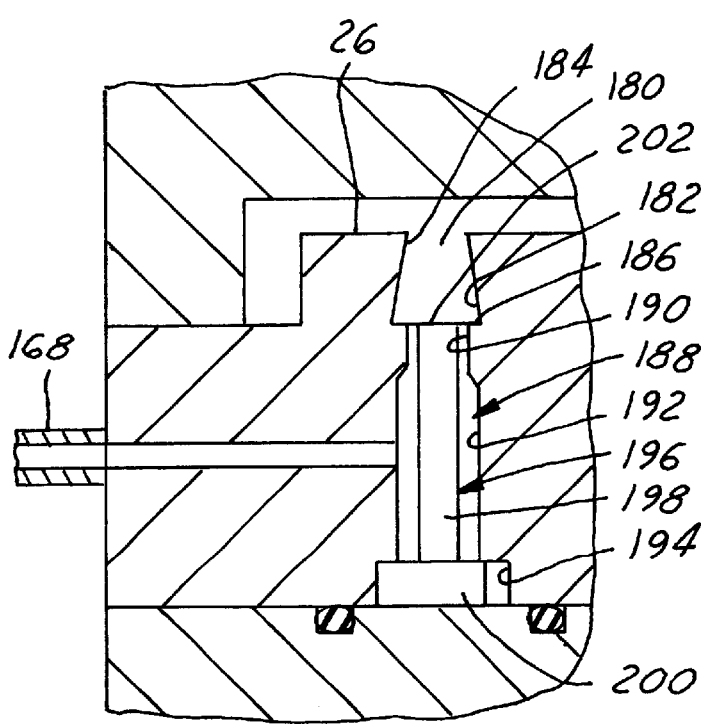
FIGS. 24 and 25 are enlarged views, partially in section, of additional embodiments according to this invention, utilizing an arrangement to lower the pressure in a sealing groove of the mold cavity prior to the injection compression molding process.

In the arrangement shown in FIG. 24, a continuous generally trapezoidally shaped seal groove 180 includes a narrow throat which opens on the mold cavity surface 26 for receiving the thermoplastic material, angled inner and outer sidewalls 182 and 184 and a base wall 186. The sidewalls 182 and 184 diverge downwardly from the throat to the base wall 186. A shaped cylindrical chamber 188 extends downwardly from the base wall 186 to evacuate gases from the seal groove 180 to the outlet line 168. The chamber 188 includes a narrowed upper chamber portion 190 which opens on and extends downwardly from the base wall 186, an enlarged lower chamber portion 192 in communication with the outlet line 168, and a lower lock recess 194. An axial seal pin 196 is mounted in the shaped chamber 188 and has a cylindrical stem 198 disposed in the upper and lower chamber portions 190 and 192 and a head 200 securely fit in the lock recess 194. The top face 202 of the stem 198 is generally planar and flush with the surface forming the base wall 186.

In operation, the seal groove 180 is evacuated and thermoplastic is introduced into the mold cavity 18 and the seal groove 180. A clearance between the stem and the wall forming the upper chamber portion 190 permits only gases to be withdrawn. Pressurized gas is introduced into the mold cavity 18 causing the thermoplastic in the seal groove 180 to be forced outwardly and against the angled outer sidewall 184. Upon the thermoplastic material hardening and becoming self-supporting upon cooling, the seal ring thus formed will be angled outwardly against the outer side 184 of the seal groove 180. The part is then removed, resulting in the seal ring formed in the seal groove 180 flexing inwardly towards the inner sidewall 182 to enable release.

Figure 25:
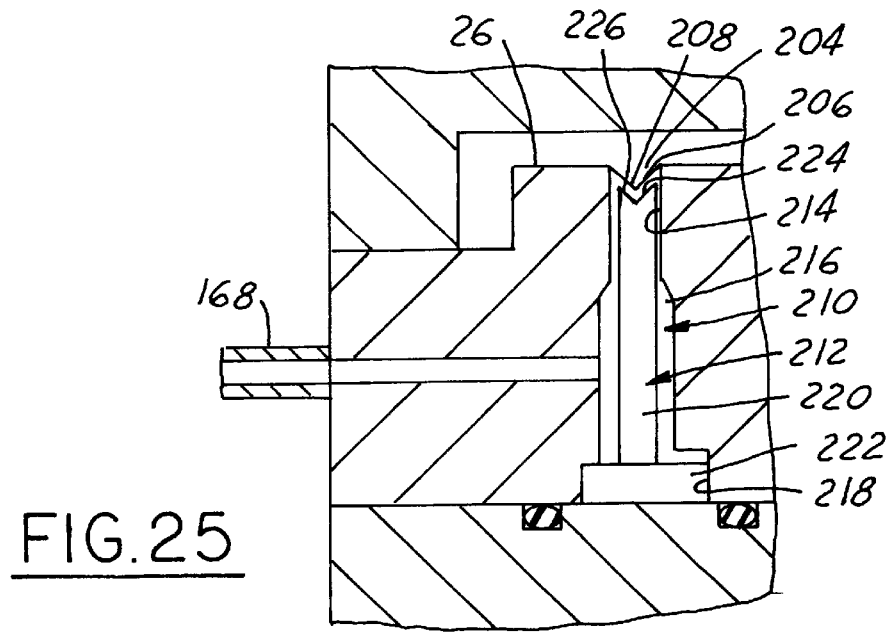

In the arrangement shown in FIG. 25, a continuous seal recess 204 of V-shaped cross-section and having opposed walls 206 and 208 is formed in the mold cavity surface 26, a shaped cylindrical chamber 210 extends downwardly from the seal recess, and a shaped axial seal pin 212 is mounted in the cylindrical chamber. The shaped cylindrical chamber 210 has a narrowed upper chamber portion 214 opening on and extending from the seal recess 204 cavity surface 26, an enlarged lower chamber portion 216 in communication with the mold cavity 18 and with the outlet line 168, and a lock recess 218. The seal pin 212 is mounted in the shaped chamber 210 and includes a cylindrical stem 220 that is disposed, in part, in the upper and lower chamber portions 214 and 216, and a head 222 that is secured in the lock recess 218 against axial and rotational movement. The top face of the stem 220 is formed by a pair of faces 224 and 226 disposed at an acute angle to one another with each being complementary with a respective wall 206 and 208 of the seal recess 204.

In operation, the seal recess 204 is evacuated and thermoplastic is introduced into the mold cavity and the seal recess 204. The clearance between the stem 220 and the wall forming the upper chamber portion 214 is sized to permit gases to be passed but not large enough to pass the thermoplastic. Thereafter, pressurized gas is introduced into the mold cavity 18.

Figure 26:
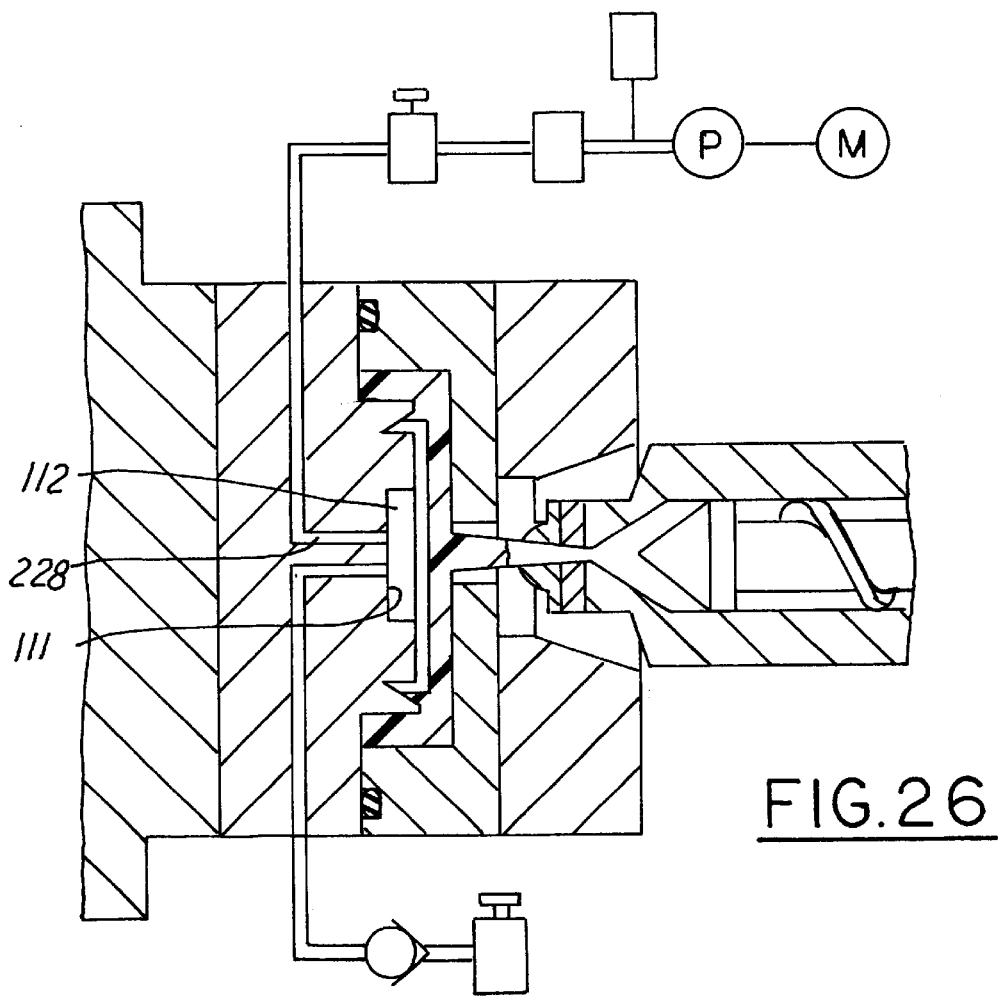
FIG. 26 is an enlarged view, partially in section, of a mold apparatus, according to another aspect of this invention.

According to this invention, and referring to FIG. 26, air is evacuated from the mold cavity 18 via the vacuum arrangement of FIG. 19 but differs in that a bleed line 228 is directly connected to the recess 111 which receives the porous sintered metal disc 112. Prior to introduction of the thermoplastic into the mold cavity, the air is evacuated from the seal recess 111 via the bleed line 228.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, specification and following claims.

What is claimed is:

1. A method of producing an injection molded article, the article having a finished outer surface, the method comprising, in sequence, clamping together the mating faces of a pair of mold portions having respective article forming surfaces whereby to define a mold cavity, the article forming surface of one of said mold portions including a continuous sealing groove;

sealing said mold cavity to form a substantially sealed condition;

evacuating the air in the sealing groove through a first gas port subsequent to the step of sealing said mold cavity to a reduced pressure which is substantially equal to or higher than about 0.9 atmospheres but below atmospheric pressure;

introducing molten thermoplastic material into the evacuated mold cavity and sealing groove;

applying a pressurized gas at least through said first gas port onto at least one surface of the thermoplastic material to force said molten thermoplastic material away from one mold portion and against the other mold portion to form the finished outer surface of the article;

allowing the material to cool and solidifying in a cooling phase; and separating the mold portions and removing the injection molded article.

2. The method as claimed in claim 1 the step of evacuating the sealing groove including:

forming a bleed groove in one of said mating faces, said bleed groove having a first end portion opening in said mold cavity to form said first gas port and a second end portion covered by the other of said mating faces;

connecting a vacuum line to the second end portion of said bleed groove; and reducing the pressure in said vacuum line to withdraw the air from said bleed groove.

3. The method as claimed in claim 2, the step of evacuating the sealing groove including:

forming an air seal between the mating faces of said mold portions, said air seal encircling said bleed groove to seal the mold cavity.

4. The method as claimed in claim 1, wherein the step of evacuating the sealing groove includes:

connecting a bleed line to said sealing groove to form said first gas port;

connecting a vacuum line to said bleed line; and reducing the pressure in said vacuum line to evacuate the air from said sealing groove.

5. The method as claimed in claim 1 wherein:

the sealing groove includes a groove wall having an opening forming said first gas port and the bleed line includes a first end portion communicating with said opening; and the evacuating step includes clearance fitting a seal pin into said opening, the clearance between the pin and the opening being sufficient to permit the passage of air and to prevent the passage of thermoplastic material.

6. The method as claimed in claim 5, wherein:

said sealing groove is formed by a throat, a pair of downwardly diverging sidewalls and a base wall, said opening being disposed in said base wall, said seal pin being formed with an end face that is generally coplanar with the base wall when the pin is disposed in said opening.

7. The method as claimed in claim 1, wherein said first gas port comprises a porous metal disc disposed in a central cavity formed in one of said article forming surfaces, said central cavity being encircled by said sealing groove, and said pressurized gas is introduced into said mold cavity through the porous metal disc.

8. A method of producing a solid injection molded article, the article having no internal voids and a sink-free exterior surface, the steps of the method comprising:

provjding closable first and second mold portions having respective first and second surfaces with side margins which abut one another when the mold is closed, the first and second surfaces forming a mold cavity therebetween and said first surface having a continuous sealing groove adjacent to said side margins;

sealing said mold cavity to define a substantially sealed condition therein and substantially maintaining said substantially sealed condition during the process of forming an injection molded article;

drawing a vacuum in the sealing groove through at least a first port operatively associated with said sealing groove subsequent to the step of sealing said mold cavity to a reduced pressure lower than atmospheric but higher than or substantially equivalent to 0.9 atm;

introducing an amount of thermoplastic into the reduced pressure mold cavity, said amount being sufficient to substantially fill the sealing groove, said thermoplastic being introduced after the vacuum drawing step;

applying gas pressure to pressurize the mold cavity through at least said first port in the first surface so as to form a gas cushion;

solidifying the solid injection molded article; and ejecting the article from the mold cavity.

9. An injection molding process for producing a solid injection molded part having no internal voids in an article defining cavity formed by a pair of relatively movable article defining surfaces, the steps of the process comprising:

sealing the article defining cavity to form a substantially sealed condition therein and substantially maintaining said sealed condition;

evacuating the air at least from an annular groove defined by two walls angled less than a 45 degree angle to define a substantially sharp configuration formed in one of said article defining surfaces at a location within the cavity, said step of evacuation being subsequent to said step of sealing the article defining cavity including evacuating the air to a reduced level that is between a point below atmospheric and a point above or substantially equal to 0.9 atm; and substantially simultaneously introducing thermoplastic into the cavity and the evacuated annular groove and introducing gas into the cavity to pack the resin against the other of said article defining surfaces.

* * * * *

UNITED STATES PATENT AND TRADEMARK OFFICE
CERTIFICATE OF CORRECTION

PATENT NO.    : 6,403,014 B1
DATED         : June 11, 2002
INVENTOR(S)   : James Watson Hendry and John Michael Heuchert It is certified that error appears in the above-identified patent and that said Letters Patent is hereby corrected as shown below:

<u>Title page,</u>
Item [73], Assignee, to read as follows:

-- Asahi Chemical Industry Co., Ltd
  2-6, Dojimahama 1-Chome
  Kita-Ku Osaka-Shi
  Osaka 530, JAPAN --

Signed and Sealed this

Twentieth Day of July, 2004

JON W. DUDAS
*Acting Director of the United States Patent and Trademark Office*